(12) United States Patent
Takahashi

(10) Patent No.: US 8,363,904 B2
(45) Date of Patent: Jan. 29, 2013

(54) OFFSET AMOUNT CALIBRATING METHOD AND SURFACE TEXTURE MEASURING MACHINE

(75) Inventor: Tomotaka Takahashi, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 356 days.

(21) Appl. No.: 12/900,834

(22) Filed: Oct. 8, 2010

(65) Prior Publication Data

US 2011/0085178 A1    Apr. 14, 2011

(30) Foreign Application Priority Data

Oct. 13, 2009  (JP) ................................. 2009-236126

(51) Int. Cl.
 *G06K 9/00* (2006.01)
 *G01B 11/24* (2006.01)
(52) U.S. Cl. ........................................ 382/108; 356/601
(58) Field of Classification Search .................. 356/601; 382/108
 See application file for complete search history.

(56) References Cited

U.S. PATENT DOCUMENTS

| | | | | |
|---|---|---|---|---|
| 5,955,661 | A | * | 9/1999 | Samsavar et al. ............... 73/105 |
| 6,067,165 | A | * | 5/2000 | Matsumiya et al. .......... 356/401 |
| 2005/0151963 | A1 | * | 7/2005 | Pulla et al. ............... 356/139.03 |

FOREIGN PATENT DOCUMENTS

| | | |
|---|---|---|
| DE | 10 2006 014 509 A1 | 9/2007 |
| JP | B2-4-78929 | 12/1992 |
| JP | A-5-87562 | 4/1993 |
| JP | B2-2794258 | 6/1998 |
| JP | A-2000-266534 | 9/2000 |
| JP | B2-3482362 | 10/2003 |
| JP | B2-3602965 | 10/2004 |
| JP | B2-3612068 | 10/2004 |
| JP | B2-3678915 | 5/2005 |
| JP | B2-3678916 | 5/2005 |
| JP | A-2007-114000 | 5/2007 |
| JP | A-2008-524565 | 7/2008 |

OTHER PUBLICATIONS

U.S. Appl. No. 12/900,867, filed Oct. 8, 2010 in the name of Sadayuki Matsukiya.
U.S. Appl. No. 12/900,788, filed Oct. 8, 2010 in the name of Yasushi Fukumoto.
Extended European Search Report issued in European Application No. 10187329.7 on Jan. 26, 2011.

\* cited by examiner

*Primary Examiner* — Roy M Punnoose
(74) *Attorney, Agent, or Firm* — Oliff & Berridge, PLC

(57) ABSTRACT

An offset amount calibrating method that obtains the offset amount between a contact-type detector and an image probe is provided. The method includes: setting on a stage a calibration chart that includes not less than two non-parallel linewidth patterns being disposed relative to a reference position of the calibration chart and each having a known width and a level difference; capturing an image of the linewidth patterns of the calibration chart by an image probe to obtain the reference position of the calibration chart; measuring at least two of the linewidth patterns of the calibration chart by a contact-type detector to obtain the reference position of the calibration chart; and calculating a difference between the reference position obtained by using the image probe and the reference position obtained by using the contact-type detector to obtain the offset amount.

6 Claims, 10 Drawing Sheets

OFFSET AMOUNT CALIBRATING METHOD AND SURFACE TEXTURE MEASURING MACHINE

The entire disclosure of Japanese Patent Application No. 2009-236126 filed Oct. 13, 2009 is expressly incorporated by reference herein.

BACKGROUND OF THE INVENTION

1. Field of the Invention

The present invention relates to a surface texture measuring machine equipped with a contact-type detector with a stylus and an image probe and to an offset amount calibrating method for obtaining the offset amount between the contact-type detector and the image probe.

2. Description of Related Art

There has been known a surface texture measuring machine in which a stylus is moved along a surface of an object while being in contact with the surface of the object. The displacement of the stylus due to the surface profile or surface roughness of the object is detected, thereby measuring the surface texture such as the surface profile, surface roughness or the like of the object based on the displacement of the stylus (see, for instance, Patent Literature: JP-A-05-087562).

In such a typical surface texture measuring machine, in order to measure the surface profile, surface roughness and the like of an object, while visually checking and adjusting the relative position between the tip end of a stylus and a measurement area on the object, an operator sets the tip end of the stylus at a measurement starting position on the object and then moves the stylus along the surface of the object. The surface texture such as the surface profile or the surface roughness of the object is measured based on the up-and-down displacement of the stylus due to the surface profile, surface roughness or the like of the object.

Due to a recent tendency for measuring minute and thin objects, objects or measuring spots are downsized. Accordingly, the above setting operation of a stylus, which is quite complicated and requires a long time, places a large burden on an operator.

In addition, some types of objects may interfere with (collide with) a stylus to damage the stylus or the objects.

Accordingly, the Applicant(s) has worked on the development of a surface texture measuring machine equipped with not only a contact-type detector with a stylus for contacting with a surface of an object but also an image probe used to capture an image of the surface of the object.

In such a machine, the image of the object is initially taken by the image probe. When a measurement starting position on the object is designated based on the taken image of the object, the movement course of a relative movement mechanism is calculated and stored so that the stylus of the contact-type detector is in contact with the measurement starting position on the object. In response to a command for measurement, the relative movement mechanism is moved in accordance with the stored movement course, so that the stylus of the contact-type detector is automatically brought into contact with the measurement starting position on the object.

In this manner, the stylus of the contact-type can be automatically set at the measurement starting position on the object. In other words, an operator does not have to set the tip end of the stylus at the measurement starting position on the object while visibly checking and adjusting the position of the tip end of the stylus relative to the measurement starting position on the object as in a typical apparatus. Therefore, the stylus can be prevented from interfering with the object while the burden on the operator can be reduced.

However, the contact-type detector with the stylus and the image probe are offset from each other in the same system for physical and structural reasons.

Therefore, at the time of switching from the image probe to the contact-type detector or switching from the contact-type detector to the image probe, the offset amount between the contact-type detector and the image probe has to be corrected. Thus, it is important for realizing highly-accurate measurement to accurately obtain the offset amount between the contact-type detector and the image probe.

SUMMARY OF THE INVENTION

An object of the present invention is to provide an offset amount calibrating method for a surface texture measuring machine equipped with a contact-type detector and an image probe, being capable of accurately and efficiently obtaining the offset amount between the contact-type detector and the image probe, and a surface texture measuring machine using the same.

According to an aspect of the invention, an offset amount calibrating method for a surface texture measuring machine including: a stage on which an object is mounted; a contact-type detector being provided with a stylus that is brought into contact with a surface of the object; an image probe that captures an image of the surface of the object; a relative movement mechanism that relatively moves the stage against the contact-type detector and the image probe and moves the contact-type detector and the image probe against the stage; and a controller that controls an operation of the relative movement mechanism and executes processing on measurement data obtained by the contact-type detector and image data obtained by the image probe, the method obtaining an offset amount between the contact-type detector and the image probe, the method includes: setting on the stage a calibration chart that includes not less than two non-parallel linewidth patterns being disposed relative to a reference position of the calibration chart and each having a known width and a level difference; capturing an image of the linewidth patterns of the calibration chart by the image probe to obtain the reference position of the calibration chart; measuring at least two of the linewidth patterns of the calibration chart by the contact-type detector to obtain the reference position of the calibration chart; and calculating a difference between the reference position obtained by using the image probe and the reference position obtained by using the contact-type detector to obtain the offset amount.

With the above arrangement, after setting on the stage the calibration chart provided with the not less than two non-parallel linewidth patterns being disposed relative to the reference position and each having the known width and the level difference (calibration chart setting step), the image of the linewidth patterns of the calibration chart is captured by the image probe to obtain the reference position of the calibration chart (first calibration measuring step). Furthermore, two of the linewidth patterns of the calibration chart are measured by the contact-type detector to obtain the reference position of the calibration chart (second calibration measuring step). The offset amount is obtained from the difference between the reference position obtained in the first calibration measuring step and the reference position obtained in the second calibration measuring step (offset amount calculating step).

As described above, the offset amount is obtained from the difference between the reference position of the calibration chart obtained based on the image captured by the image probe and the reference position of the calibration chart obtained based on the measurement by the contact-type detector. Thus, the offset amount between the contact-type detector and the image probe can be accurately and efficiently obtained.

In the method, it is preferable that the calibration chart includes at least one of a rhombic linewidth pattern formed by combining in a rhombic shape the linewidth patterns and a cross-shaped linewidth pattern formed by combining in a cross the linewidth patterns.

With the above arrangement, even when the calibration chart is not accurately oriented at the time of setting the calibration chart on the stage, the calibration chart can be set in an orientation allowing the contact-type detector to measure at least two of the linewidth patterns of the calibration chart in the second calibration measuring step. Thus, the calibration can be efficiently performed.

In the method, it is preferable that at least one of the stylus of the contact-type detector and the image probe is exchangeable, and upon exchanging, the setting of the calibration chart, the obtaining of the reference position by using the image probe, the obtaining of the reference position by using the contact-type detector and the calculating of the offset amount are performed.

With the above arrangement, since at least one of the stylus of the contact-type detector and the image probe is exchangeable, the stylus and/or the image probe can be exchanged with one appropriate for the measurement portion of an object.

Furthermore, after exchanging the contact-type detector and/or the image probe, the calibration chart setting step, the first calibration measuring step, the second calibration measuring step and the offset amount calculating step are performed to recalibrate the offset amount between the contact-type detector and the image probe, so that high accuracy in measurement can be always secured irrespective of the exchange of the contact-type detector and/or the image probe.

According to another aspect of the invention, a surface texture measuring machine includes: a stage on which an object is mounted; a contact-type detector being provided with a stylus that is brought into contact with a surface of the object; an image probe that captures an image of the surface of the object; a relative movement mechanism that relatively moves the stage against the contact-type detector and the image probe and moves the contact-type detector and the image probe against the stage; a controller that controls an operation of the relative movement mechanism and executes processing on measurement data obtained by the contact-type detector and image data obtained by the image probe; and an offset amount storage unit that stores an offset amount obtained by the above offset amount calibrating method, in which when a measuring starting position on the object is designated based on the image of the object captured by the image probe, the controller operates the relative movement mechanism so that the stylus of the contact-type detector is brought into contact with the measurement starting position on the object in accordance with the offset amount stored in the offset amount storage unit as a compensation value.

With this arrangement, the image of the object is initially captured by the image probe. Subsequently, when a measuring starting position on the object is designated based on the image of the object captured by the image probe, the relative movement mechanism is operated so that the stylus of the contact-type detector is brought into contact with the measurement starting position on the object in accordance with the offset amount stored in the offset amount storage unit as the compensation value.

In this manner, the stylus of the contact-type can be automatically set at the measurement starting position on the object. In other words, an operator does not have to set the tip end of the stylus at the measurement starting position on the object while visibly checking and adjusting the position of the tip end of the stylus relative to the measurement starting position on the object as in a typical apparatus. Therefore, the stylus can be prevented from interfering with the object while the burden on the operator can be reduced.

DETAILED DESCRIPTION OF PREFERRED EMBODIMENTS

Description of Surface Texture Measuring Machine (Reference to FIGS. 1 to 5)

Figure 1:
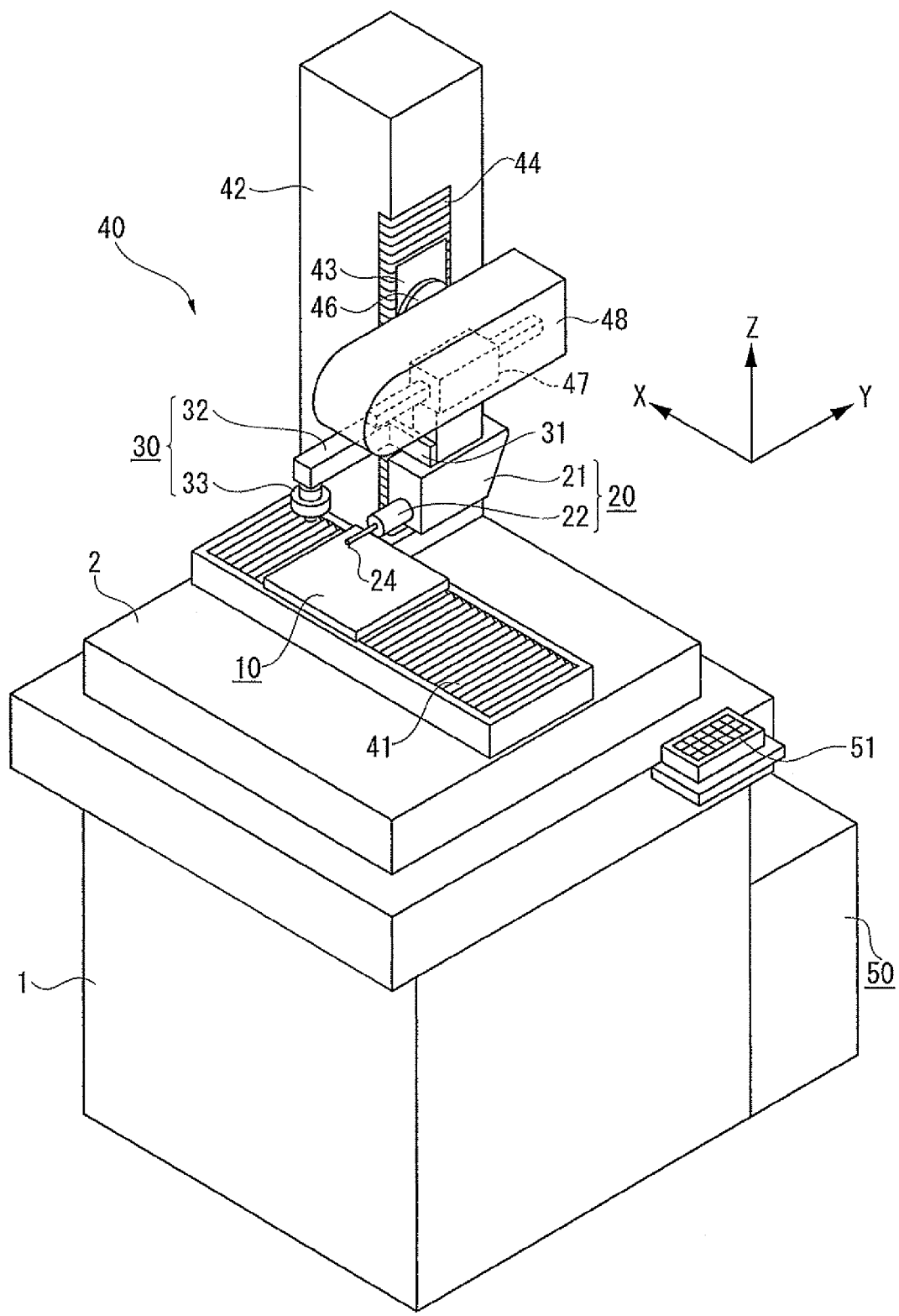
FIG. 1 is a perspective view showing a surface texture measuring machine according to an exemplary embodiment of the present invention.
Figure 2:
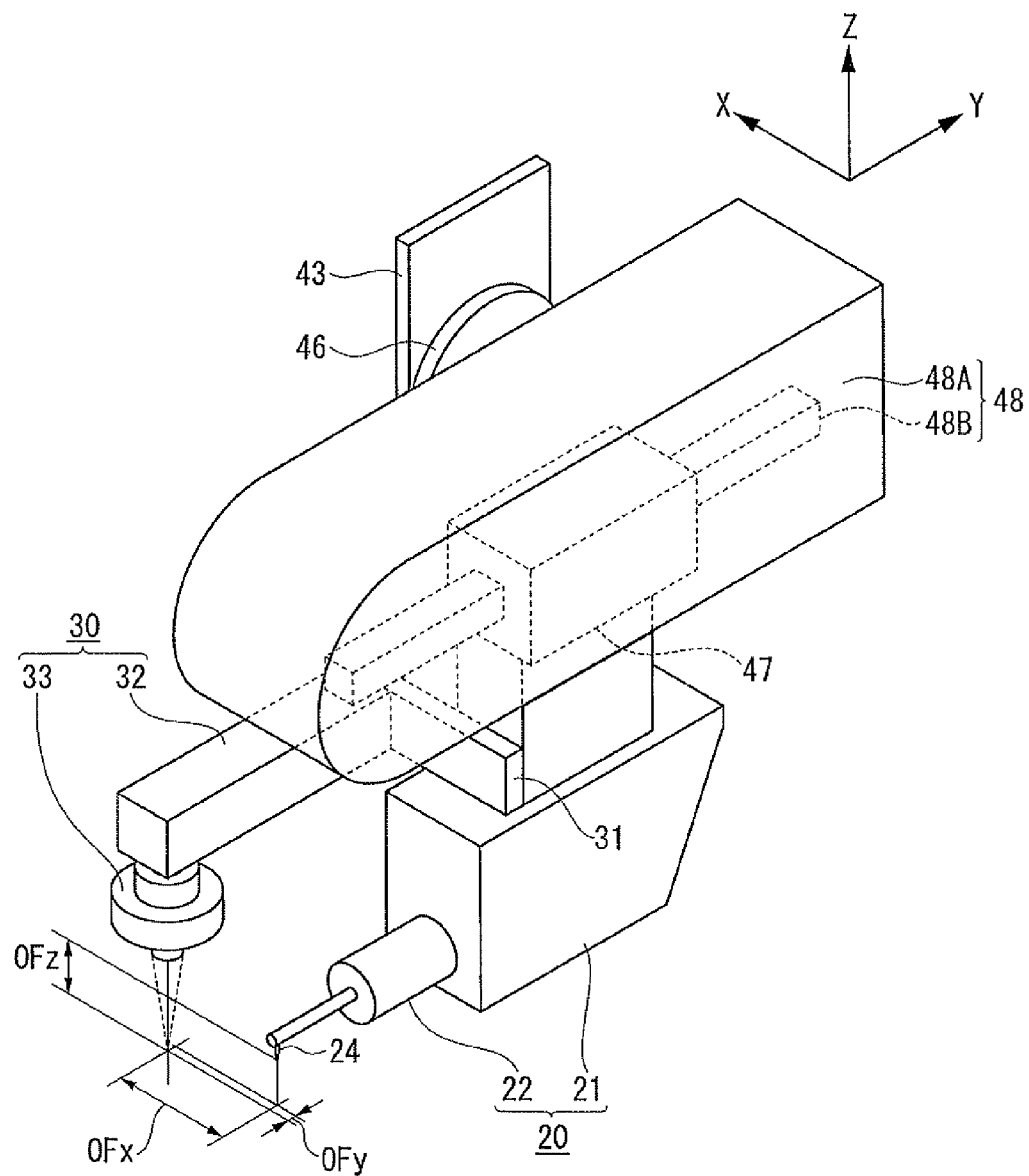
FIG. 2 is an enlarged perspective view showing a contact-type detector and an image probe according to the exemplary embodiment.

As shown in FIGS. 1 and 2, a surface texture measuring machine according to an exemplary embodiment of the present invention includes: a mount stand 1; a base 2 being fixed on the upper surface of the mount stand 1; a stage 10 being mounted on the base 2, the stage 10 having an upper surface on which an object is mounted; a contact-type detector 20 being provided with a stylus 24 that is brought into contact with a surface of the object; an image probe 30 that captures the image of the surface of the object; a relative movement mechanism 40 that relatively moves the contact-type detector 20 and the image probe 30 against the stage 10 and moves the stage 10 against the contact-type detector 20 and the image probe 30; and a controller 50.

The relative movement mechanism 40 includes: an X-axis driving mechanism 41 as a first movement mechanism being located between the base 2 and the stage 10 to move the stage 10 in a horizontal direction (X-axis direction); a column 42 that stands upright on the upper surface of the base 2; a Z-slider 43 as a lifting member that is provided to the column 42 movably in an up-and-down direction (Z-axis direction); a Z-axis driving mechanism 44 as a second movement mechanism that moves the Z-slider 43 in the up-and-down direction; a rotary plate 46 being provided to the Z-slider 43 via a rotation mechanism 45 (see FIG. 5) rotatably around the X-axis; a Y-slider 47 as a slide member being provided to the rotary plate 46 movably in a perpendicular direction (Y-axis direction) to the movement direction of the stage 10 (X-axis direction) and the lifting direction of the Z-slider 43 (Z-axis direction); and a Y-axis driving mechanism 48 as a third movement mechanism that moves the Y-slider 47 in the Y-axis direction.

In this exemplary embodiment, the contact-type detector 20 and the image probe 30 are attached to the Y-slider 47. Therefore, the relative movement mechanism 40 is provided by a three-dimensional movement mechanism that includes the X-axis driving mechanism 41 that moves the stage 10 in the X-axis direction, the Z-axis driving mechanism 44 that moves the contact-type detector 20 and the image probe 30 in the Z-axis direction, and the Y-axis driving mechanism 48 that moves the contact-type detector 20 and the image probe 30 in the Y-axis direction.

Each of the X-axis driving mechanism 41 and the Z-axis driving mechanism 44 is provided by, for instance, a feed screw mechanism (not shown) that includes a ball screw shaft and a nut member screwed to the ball screw shaft.

The Y-axis driving mechanism 48 includes a driving mechanism body 48A, and a guide rail 48B being provided to the driving mechanism body 48A in parallel with the Y-axis direction to movably support the Y-slider 47, a driving source (not shown) that drives the Y-slider 47 to reciprocate along the guide rail 48B, and the like.

Figure 3:
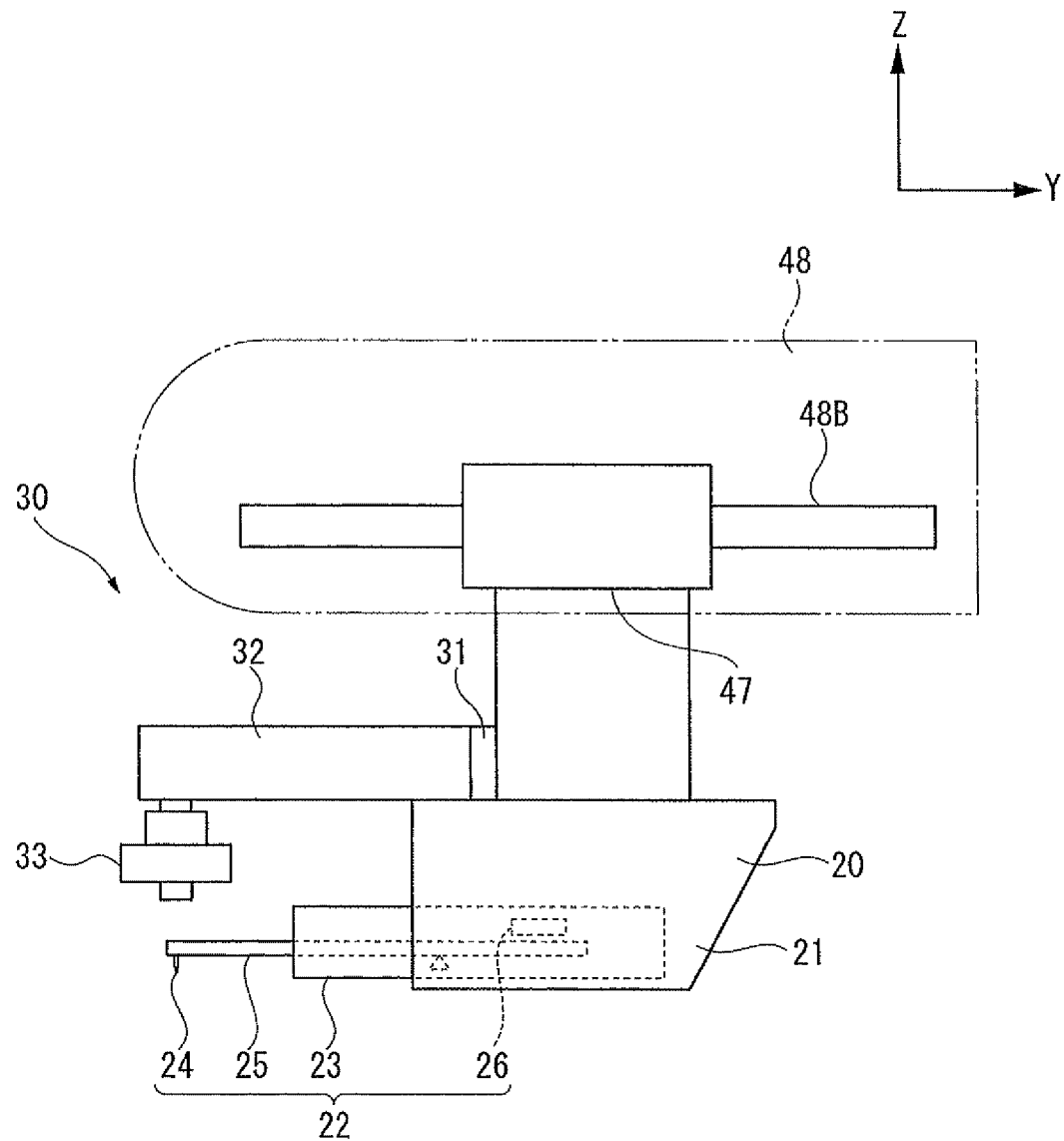
FIG. 3 is a front view showing the contact-type detector and the image probe according to the exemplary embodiment.

As shown in FIG. 3, the contact-type detector 20 includes a detector body 21 being hung and supported on the Y-slider 47, and a contact-type probe 22 being supported on the detector body 21 in parallel with the Y-axis direction. The contact-type probe 22 includes a probe body 23, an arm 25 being swingably supported on the probe body 23 and being provided with the stylus 24 at a tip end thereof, and a detecting portion 26 that detects the swing amount of the arm 25. Incidentally, the stylus 24 (in this exemplary embodiment, the arm 25 provided with the stylus 24) is exchangeably attached to the probe body 23.

The image probe 30 includes a cylindrical probe body 32 being integrally connected to the Y-slider 47 via a connecting member 31 along with the contact-type detector 20, and an exchangeable probe head 33 being downwardly attached to the tip end of the probe body 32.

Figure 4:
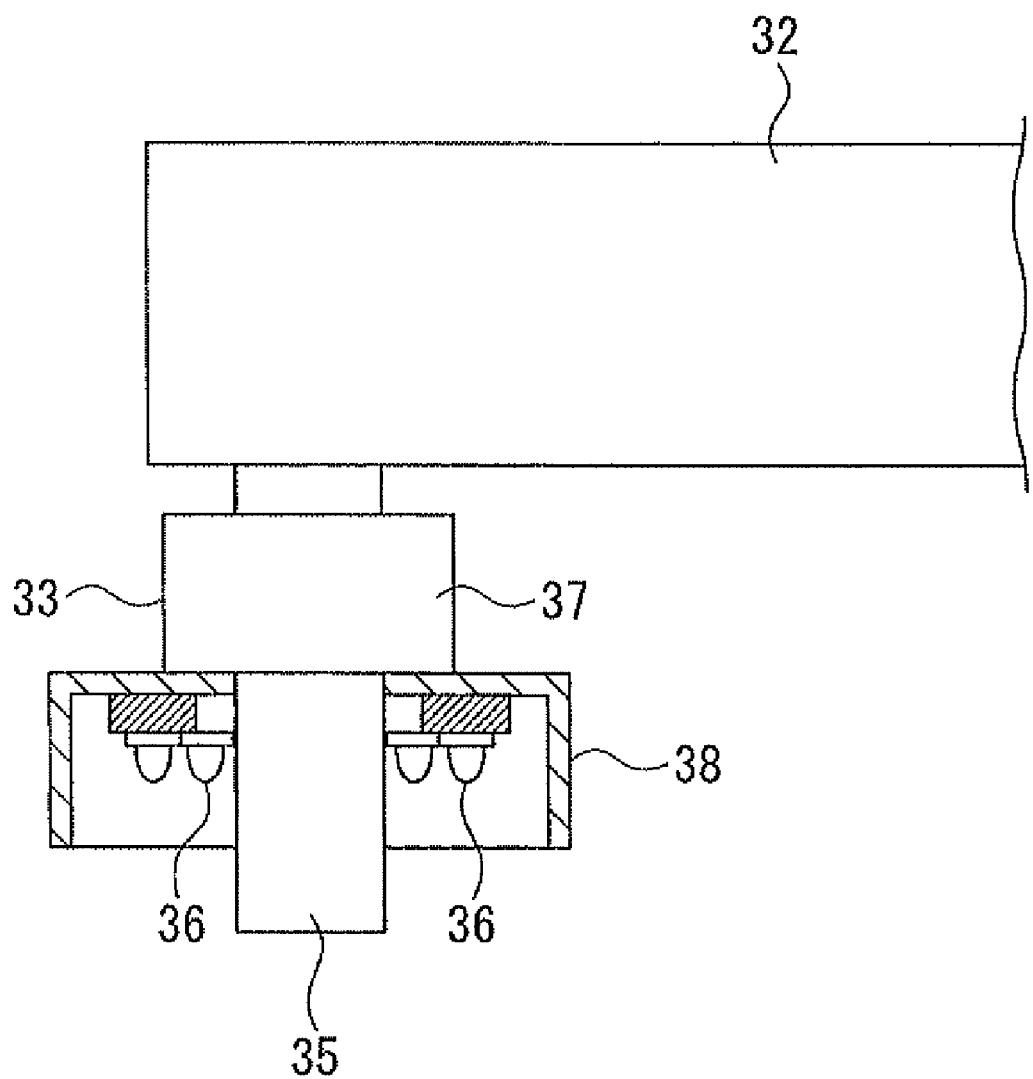
FIG. 4 shows the image probe according to the exemplary embodiment.

As shown in FIG. 4, the probe head 33 includes an objective lens 35, an LED 36 as a light source being located on the outer periphery of the objective lens 35, a CCD sensor 37 that receives reflected light from the object that has passed through the objective lens 35 to capture the image of the object, and a cover 38 that covers the LED 36 and the surroundings thereof.

The image probe 30 is located at a position offset relative to the contact-type detector 20. Specifically, as shown in FIG. 2, the focal point of the objective lens 35 of the image probe 30 is set at a position offset downwardly from the tip end of the stylus 24 of the contact-type detector 20 in the Z-axis direction by an offset amount OFz, and offset from the longitudinal axis of the stylus 24 in the X-axis direction and the Y-axis direction respectively by an offset amount OFx and an offset amount OFy.

Figure 5:
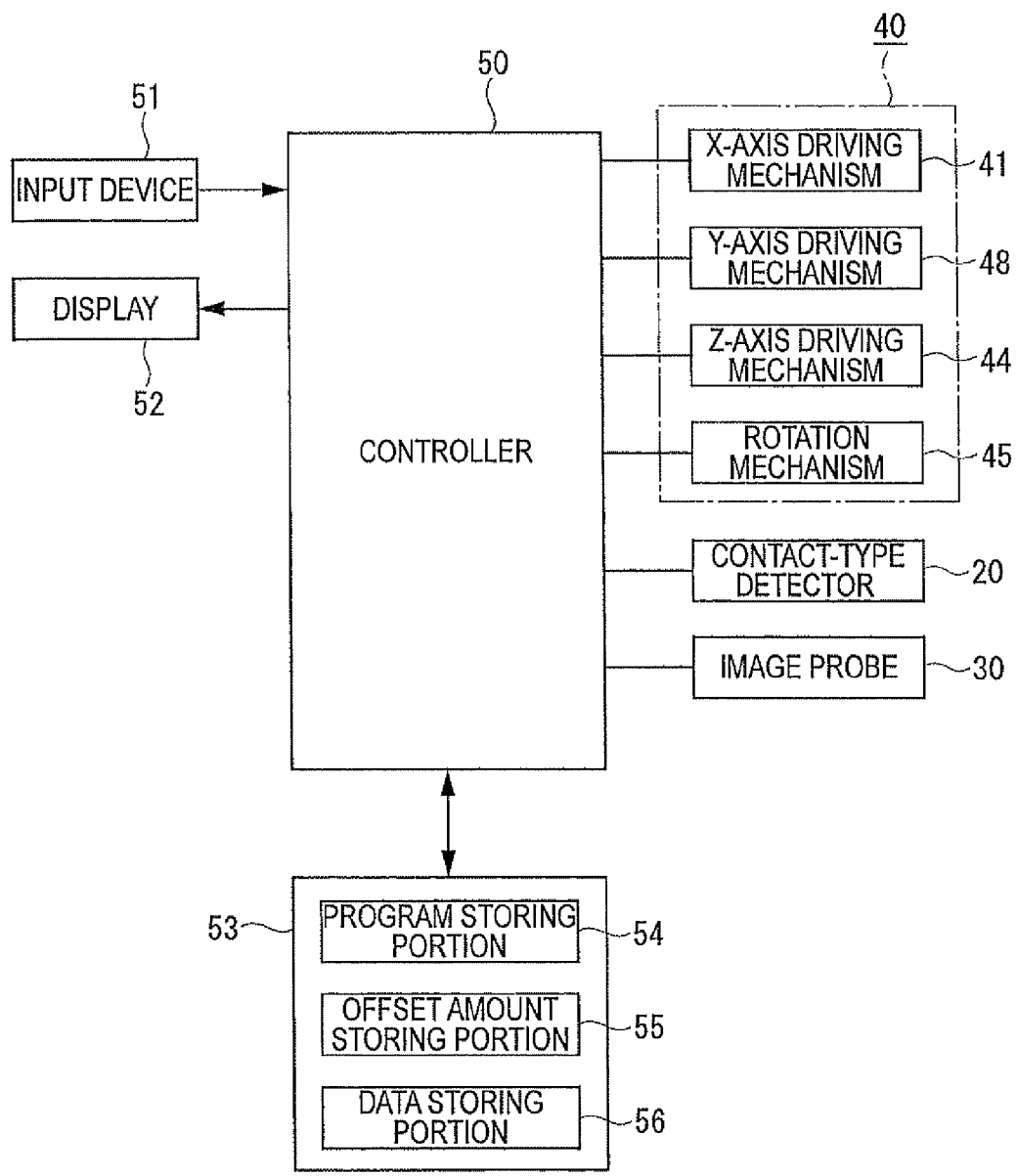
FIG. 5 is a block diagram showing a control system according to the exemplary embodiment.

As shown in FIG. 5, the controller 50 is connected to an input device 51, a display 52 and a storage 53 in addition to the relative movement mechanism 40, the contact-type detector 20 and the image probe 30.

The input device 51 is provided by, for instance, a portable keyboard, a joystick or the like and is used not only to input various kinds of operation commands and data but also to designate a position at which the stylus 24 is to be set (measurement starting position) in accordance with the image captured by the image probe 30.

The display 52 shows not only the image captured by the image probe 30 but also profile and/or roughness data obtained by the contact-type detector 20.

The storage 53 includes a program storing portion 54 that stores a measurement program and the like, an offset amount storing portion 55 as an offset amount storage unit that stores the offset amounts OFx, OFy and OFz between the stylus 24 of the contact-type detector 20 and the image probe 30, a data storing portion 56 that stores image data and measurement data obtained in measurement, and the like.

The controller 50 includes: a stylus setting unit that, when the measurement starting position is designated based on the image of the object taken by the image probe 30 in accordance with the measurement program stored in the program storing portion 54, operates the relative movement mechanism 40 in accordance with the offset amounts OFx, OFy and OFz stored in the offset amount storing portion 55 as compensation values so that the stylus 24 of the contact-type detector 20 is brought into contact with the measurement starting position on the object; and a measurement performing unit that operates the relative movement mechanism 40 so that the contact-type detector 20 is moved relative to the object while the stylus 24 of the contact-type detector 20 is in contact with the object, thereby measuring the surface texture of the object.

The controller 50 further includes an edge detection function for detecting the edge of the object in the image of the object taken by the image probe 30, and an auto-focusing function for moving the objective lens 35 in the heigthwise direction of the object (Z-axis direction) so that the focal point of the objective lens is set at the surface of the object defined in the heigthwise direction to detect the heigthwise position of the object depending on the amount of the displacement of the objective lens 35. The edge detection function may be based on any known principle of detection but may use, for instance, a technique in which an average intensity (light intensity) in a direction perpendicular to the detection direction of the image probe 30 is obtained to detect a position at which the average intensity becomes equal to or below a preset threshold as the edge.

Figure 6:
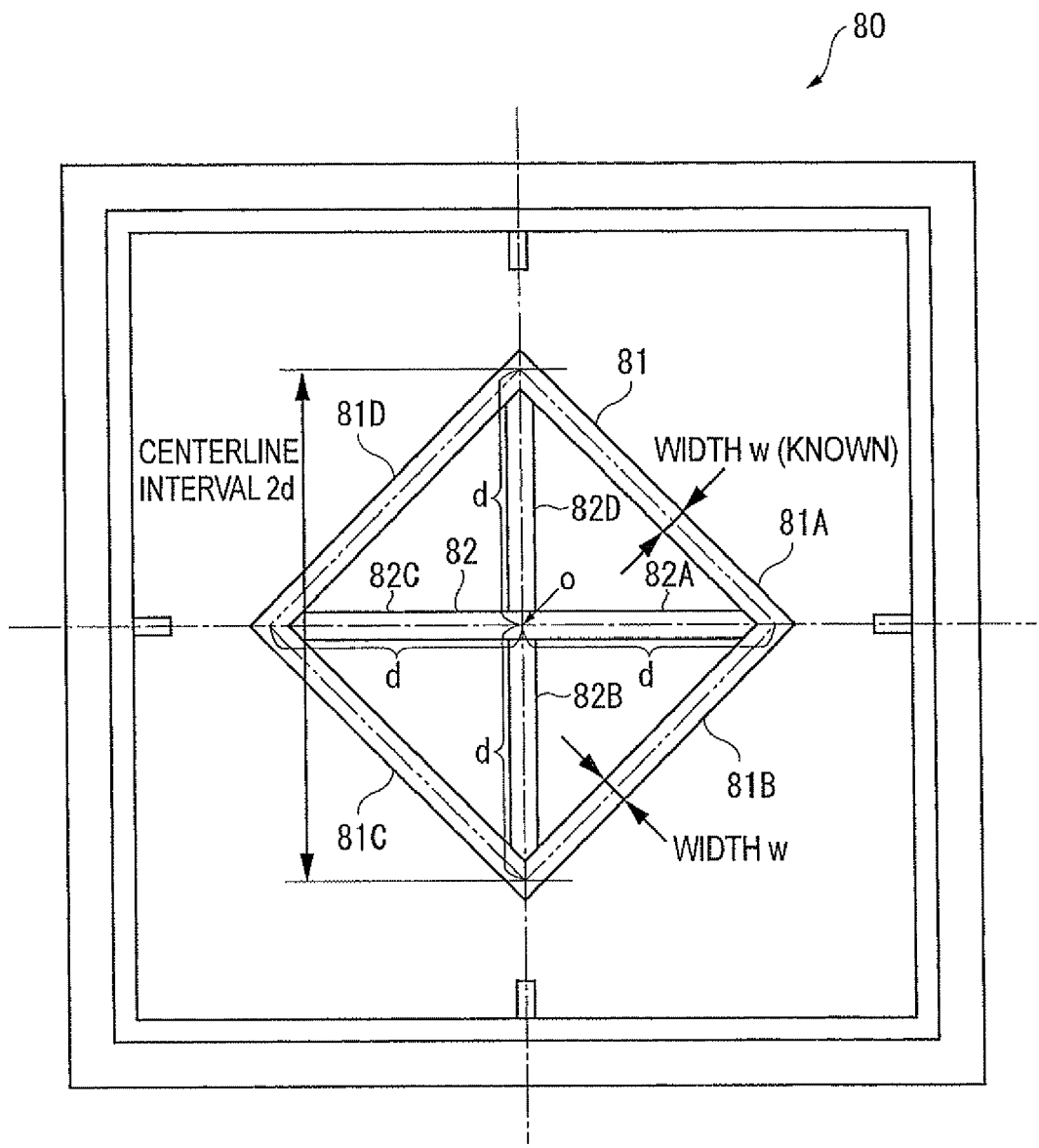
FIG. 6 shows a calibration chart used for an offset amount calibrating method according to the exemplary embodiment.

Description of Calibration Chart (Reference to FIG. 6)

As shown in FIG. 6, a calibration chart 80 includes a rhombic linewidth pattern 81 and a cross-shaped linewidth pattern 82 provided inside the rhombic linewidth pattern 81. A reference position o is set at the center of the rhombic linewidth pattern 81 and the cross-shaped linewidth pattern 82.

The rhombic linewidth pattern 81 is formed in a rhombic shape by combining in a rhombic shape four linewidth patterns 81A to 81D each having a width w (known) and a level difference (thickness) and being inclined at 45 degrees such that each of centerline intervals between the linewidth pattern 81A to 81D on the diagonals of the rhombic shape becomes 2d. The cross-shaped linewidth pattern 82 is formed in a cross shape by combining in a cross linewidth patterns 82A to 82D linking the corners of the rhombic linewidth pattern 81 and each having a linewidth (known) and a level difference (thickness).

Incidentally, the shape of the calibration chart 80 is not necessarily limited to the above shape including the rhombic linewidth pattern 81 and the cross-shaped linewidth pattern 82 but may be any shape including not less than two non-parallel linewidth patterns being disposed relative to the reference position o and each having a level difference as well as known inclination and width.

Description of Offset Amount Calibrating Method
(Reference to FIGS. 7 to 10)

The offset amount between the contact-type detector 20 and the image probe 30 is obtained as follows.
(A) The calibration chart 80 is set and fixed on the stage 10 (calibration chart setting step).

In setting and fixing the calibration chart 80, as long as the position of the calibration chart 80 is not deviated on the stage 10, the calibration chart 80 may be rotated in the X-axis or Y-axis direction of the measuring machine.

(B) In the above state, the image of the linewidth patterns of the calibration chart 80 is captured by the image probe 30 to obtain the reference position o of the calibration chart 80 (first calibration measuring step).

Specifically, the relative movement mechanism 40 is driven so that the calibration chart 80 enters the field of view of the image probe 30 and then an image processing calibration is performed on the image of the calibration chart 80 captured by the image probe 30 to obtain the reference position o of the calibration chart 80.

For instance, the edges of the four linewidth patterns 81A to 81D of the rhombic linewidth pattern 81 are detected to obtain the edge lines of the linewidth patterns 81A to 81D (i.e., the inside lines and outside lines of the linewidth patterns) and then the centerlines (shown by chain double-dashed lines in FIG. 6) of the linewidth patterns 81A to 81D are obtained based on the edge lines to calculate the coordinates of the center of a rectangle surrounded by these centerlines (shown by chain double-dashed lines in FIG. 6), thereby obtaining the reference position o of the calibration chart 80. Alternatively, the coordinates of the intersections between the centerlines (shown by chain double-dashed lines in FIG. 6) of the linewidth patterns 81A to 81D are calculated and then the coordinates of the midpoint between diagonal ones of the intersections are calculated, thereby obtaining the reference position o of the calibration chart 80.

Figure 7:
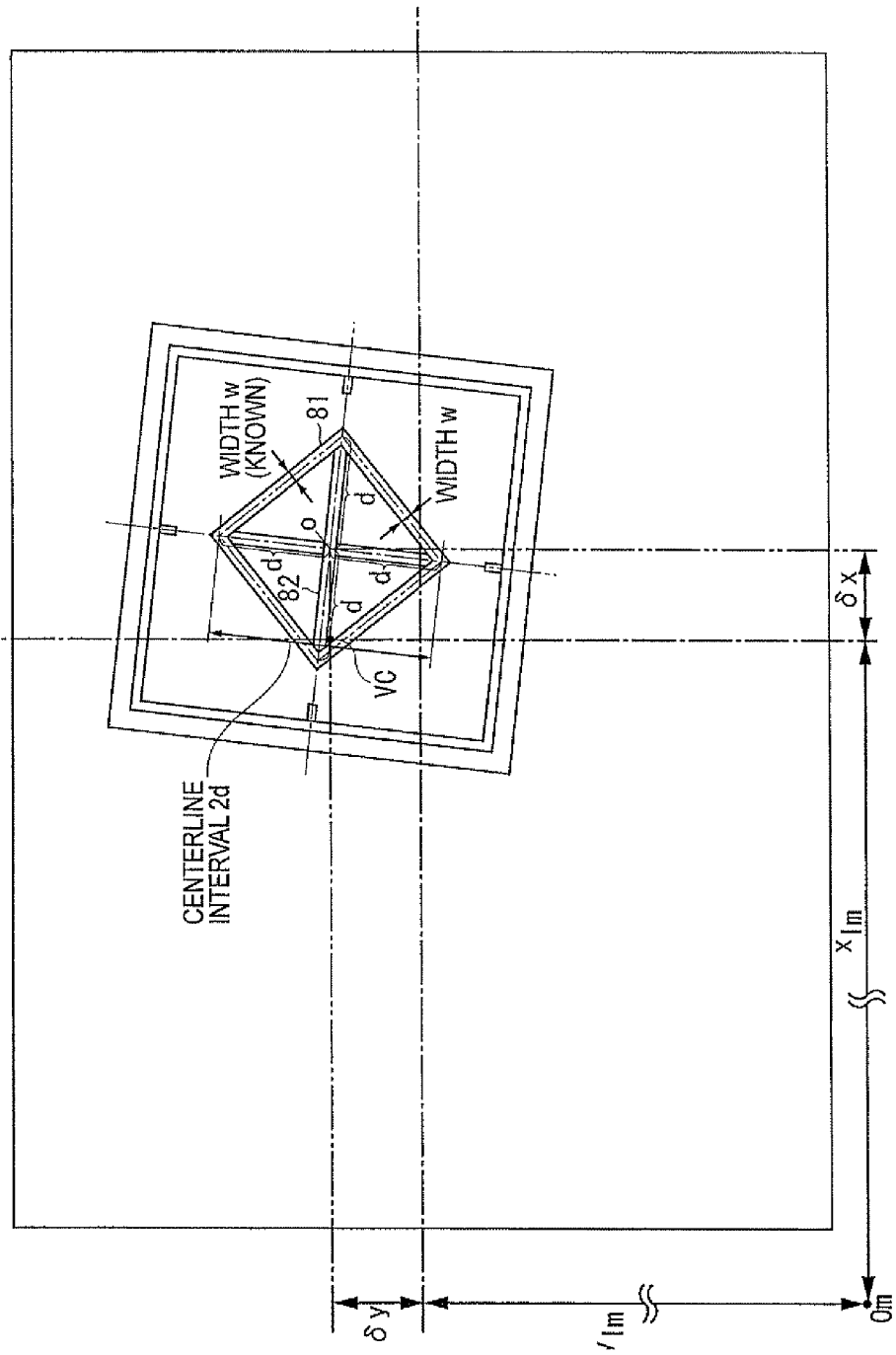
FIG. 7 shows a first measuring step of the offset amount calibrating method according to the exemplary embodiment.

FIG. 7 shows an image captured by the image probe 30 after relative movement. The movement amounts of the Y-axis driving mechanism 48 and the X-axis driving mechanism 41 of the relative movement mechanism 40 (count values of encoders respectively provided to the driving shafts thereof), i.e., the coordinates of the center of the view angle of the image probe 30 in which a machine origin (length-measuring origin) is set at Om), is expressed as $(x_{Im}, y_{Im})$. A distance from the center of the view angle to the reference position o is expressed as $(\delta x, \delta y)$. Thus, in the image of the calibration chart 80 captured by the image probe 30, the reference position o is expressed as $(x_{Im}+\delta x, y_{Im}+\delta y)$.

(C) Next, the relative movement mechanism 40 is operated so that the stylus 24 of the contact-type detector 20 is moved to a position at which the stylus 24 of the contact-type detector 20 can move across at least two of the linewidth patterns of the calibration chart 80.

For instance, the X-axis driving mechanism 41 is operated to move the stage 10 to a position where two of the linewidth patterns of the calibration chart 80 intersect with the direction of the scanning measurement line of the stylus 24 of the contact-type detector 20 (Y-axis direction).

(D) The at least two linewidth patterns of the calibration chart 80 are then measured by the stylus 24 of the contact-type detector 20 and the measurement result is used to obtain the reference position o of the calibration chart 80 (second calibration measuring step).

Figure 8:
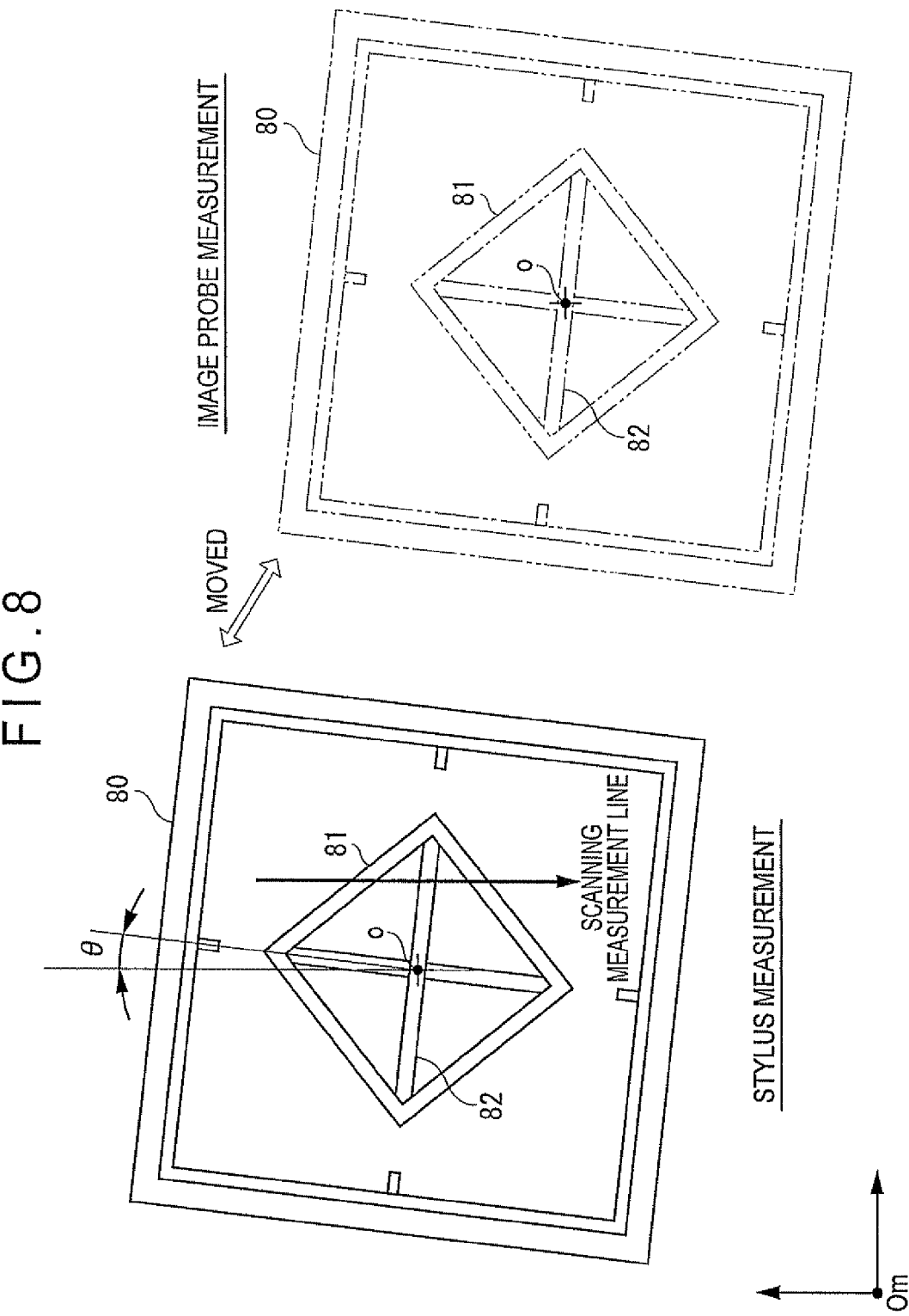
FIG. 8 shows a second measuring step of the offset amount calibrating method according to the exemplary embodiment.

For instance, as shown in FIG. 8, the stylus 24 of the contact-type detector 20 is moved along the scanning measurement line to measure the two linewidth patterns of the rhombic linewidth pattern 81 of the calibration chart 80 and obtain the reference position o of the calibration chart 80 from the measurement result. Specifically, the reference position o is obtained as follows.

(D-1) The rotation amount θ of the calibration chart 80 relative to the stage 10 is initially calculated.

Incidentally, though the rotation amount θ of the calibration chart 80 relative to the stage 10 can be measured by the image probe 30, in this exemplary embodiment, in order to prevent possible errors due to measurement conditions, the rotation amount θ of the calibration chart 80 is measured when the linewidth patterns of the calibration chart 80 are measured by the stylus 24 of the contact-type detector 20.

Figure 9:
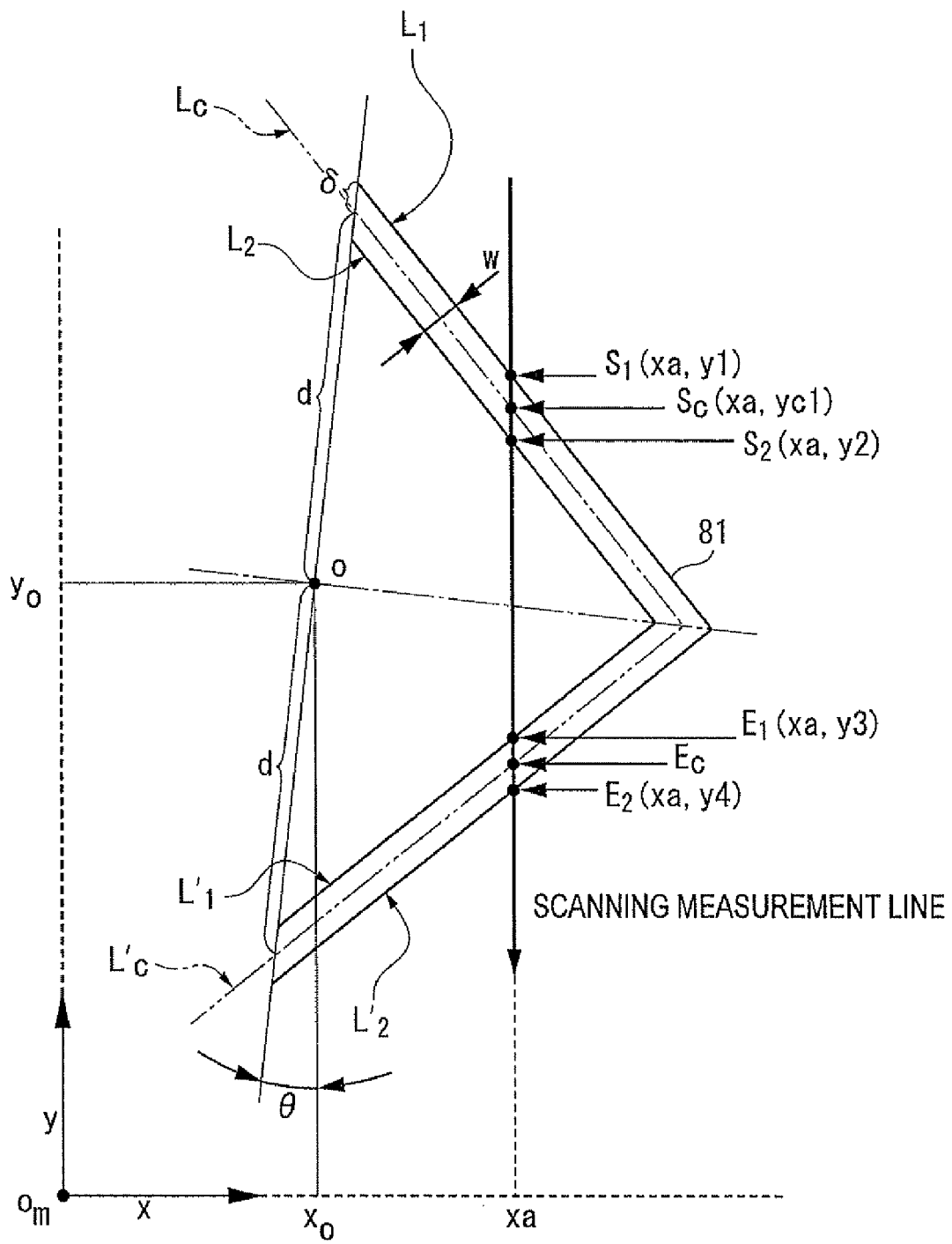
FIG. 9 is a view for explaining calculation of the rotation amount of the calibration chart in the second measuring step.
Figure 10:
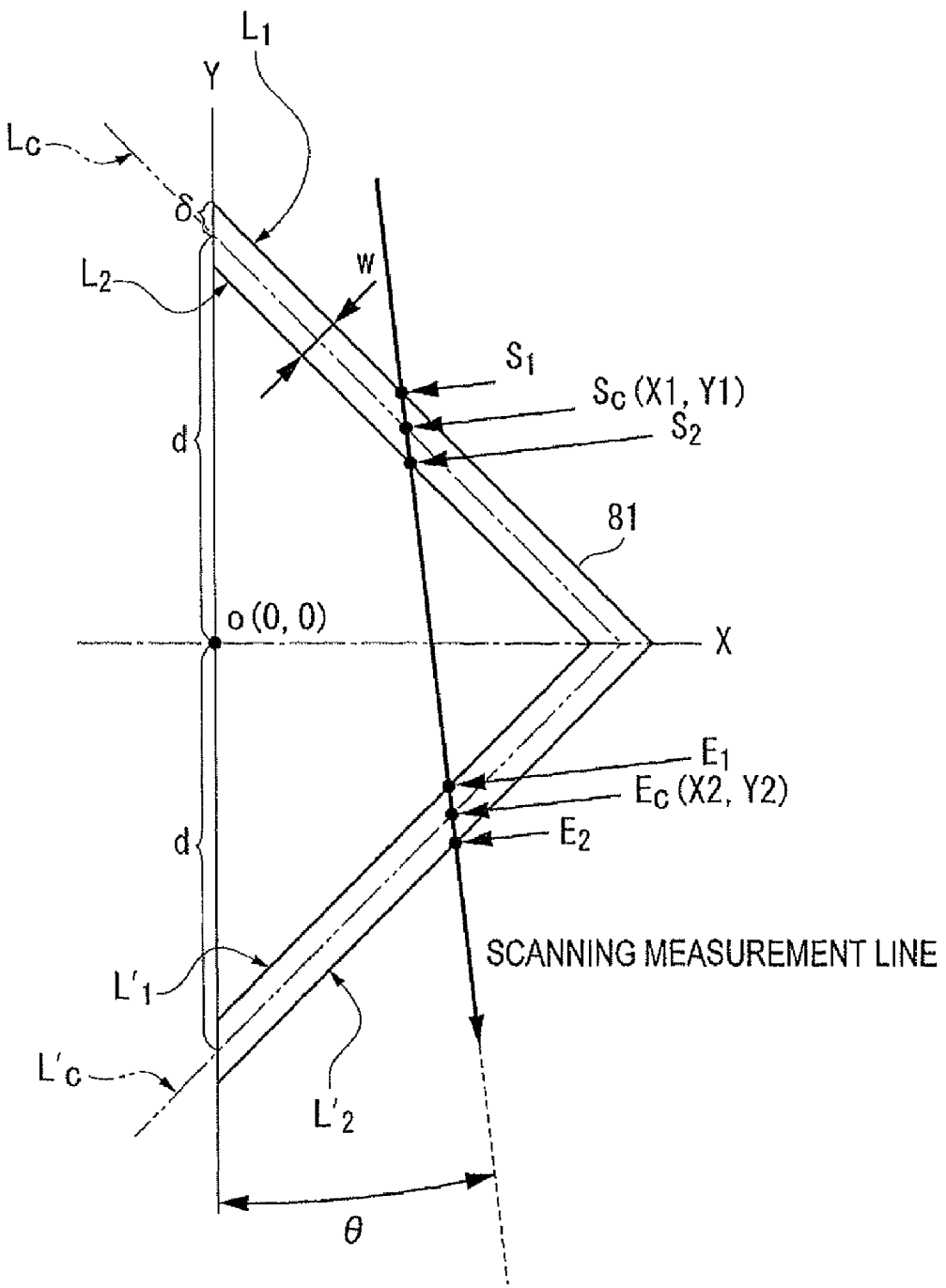
FIG. 10 is a view for explaining calculation of the reference position of the calibration chart in the second measuring step.

As shown in FIG. 9, the stylus 24 of the contact-type detector 20 is moved in the direction of the scanning measurement line (Y-axis direction) to measure the two linewidth patterns of the rhombic linewidth pattern 81 of the calibration chart 80. The width of the measured linewidth pattern along the scanning measurement line, i.e., a width corresponding to $S_1$-$S_2$ between a measurement value $S_1(xa, y1)$ and a measurement value $S_2(xa, y2)$ or a width corresponding to $E_1$-$E_2$ between a measurement value $E_1(xa, y3)$ and a measurement value $E_2(xa, y4)$, is compared with the width of the linewidth patterns along the scanning measurement line (i.e., scanning width: $2\delta$) obtained when the calibration chart 80 is fixed without rotation relative to the stage 10 to calculate the rotation amount θ of the calibration chart 80 relative to the stage 10.

Given that LS represents the width of $S_1$-$S_2$, $LS=|y2-y1|$. When $2\delta$ is larger than LS, the calibration chart 80 is rotated as shown in FIG. 9.

$$LS \times \cos\theta - LS \times \sin\theta = 2\delta$$

$$\sqrt{2} \times \sin(\theta - \pi/4) = 2\delta/LS$$

$$\theta = \sin^{-1}(\sqrt{(2\delta/LS)}) + \pi/4\ [rad]$$

Likewise, given that LE represents the width of $E_1$-$E_2$, since $LE=|y4-y3|$, $LE \times \cos\theta + LE \times \sin\theta = 2\delta$.

Thus, the following equation is derived.

$$\theta = \sin^{-1}(\sqrt{(2\delta/LE)}) - \pi/4\ [rad]$$

Based on the known scanning width $2\delta$ of the linewidth patterns and the widths between the measurement values of the linewidth patterns, the rotation amount θ of the calibration chart 80 relative to the stage 10 can be obtained. In this exemplary embodiment, the average value of the two obtained rotation values θ is used as a rotation amount when the calibration chart 80 is set.

(D-2) The measured points and the like are defined in a coordinate system with the origin at the reference position o of the calibration chart 80.

In this coordinate system with the origin at the reference position o of the calibration chart 80, conditions that are known and the values (parameters) obtained by the measurement are expressed as follows.

the centerline of the linewidth pattern $Lc: Y=f(x)$      Equation (1)

(e.g., $y=-x+d$)      Equation (1'))

The rotation amount θ of the calibration chart is set at the value obtained in the above (D-1) (clockwise is positive).

The distance of Sc-Ec is set at D based on the measurement result.

Incidentally, Sc and Ec respectively represent the intersections of the scanning measurement line with the centerlines Lc and L'c.

The intersection Sc of the scanning measurement line with the centerline Lc is defined as (X1, f(X1)). In this exemplary embodiment, Equation (1) is used to simply define the intersection Sc as (X1, −X1+d).

Next, the coordinates of the intersection Ec of the scanning measurement line and the centerline L'c is expressed using X1 defined above.

Given that a straight line (scanning measurement line) passing through the intersection Sc and having an inclination of 1/tan θ intersects with the centerline L'c [y=g(x): e.g., y=x−d] at the intersection Ec, the following equations are derived:

$$Y = (1/\tan\theta)X2 + f(X1) - (X1/\tan\theta) \quad \text{Equation (2)}$$

$$\rightarrow Y = (1/\tan\theta)X2 - X1 + d - (X1/\tan\theta) \quad \text{Equation (2')}$$

$$Y = g(X2) \quad \text{Equation (3)}$$

$$\rightarrow Y = X2 - d \quad \text{Equation (3')}$$

When Equation (2') and Equation (3') are simultaneously solved, X2 is expressed using X1 as follows.

$$X2 = \{2d - X1 - (X1/\tan\theta)\}/\{1 - (1/\tan\theta)\} \quad \text{Equation (4)}$$

Since the measurement result shows that the distance of Sc-Ec is D, the following equation is derived.

$$X2 - X1 = -D\cdot\sin\theta \quad \text{Equation (5)}$$

When Equation (5) is substituted into Equation (4), the following equation is derived.

$$[\{2d - X1 - (X1/\tan\theta)\}/\{1 - (1/\tan\theta)\}] - X1 = -D\cdot\sin\theta$$

$$\{(2d\cdot\tan\theta - X1\cdot\tan\theta - X1)/(\tan\theta - 1)\} - X1 = -D\cdot\sin\theta$$

$$2d\cdot\tan\theta - 2X1\cdot\tan\theta = -D\cdot\sin\theta(\tan\theta - 1)$$

$$X1 = \{2d\cdot\tan\theta + D\cdot\sin\theta\cdot(\tan\theta - 1)\}/2\cdot\tan\theta = d + (D/2)(\sin\theta - \cos\theta)$$

The coordinates of the intersection Sc in the coordinate system with the origin at the reference position o of the calibration chart 80 is expressed as follows.

$$(X1, Y1) = [d + (2/D)(\sin\theta - \cos\theta), -(D/2)(\sin\theta - \cos\theta)]$$

The coordinates of the intersection Sc in the coordinate system with the origin at the machine origin Om is expressed based on the measurement values as (xa, yc1).

The coordinate system with the origin at the machine origin Om is converted to the coordinate system with the origin at the reference position o.

after conversion to the coordinates o (x0, y0)

F: conversion by −θ rotation around the reference position o $$\begin{pmatrix} X \\ Y \end{pmatrix} = F \cdot \left( \begin{pmatrix} x \\ y \end{pmatrix} - A \right)$$

$$\begin{pmatrix} X \\ Y \end{pmatrix} = \begin{pmatrix} \cos(-\theta) & -\sin(-\theta) \\ \sin(-\theta) & \cos(-\theta) \end{pmatrix} \cdot \left( \begin{pmatrix} x \\ y \end{pmatrix} - \begin{pmatrix} x0 \\ y0 \end{pmatrix} \right)$$

$$= \begin{pmatrix} \cos(-\theta) & -\sin(-\theta) \\ \sin(-\theta) & \cos(-\theta) \end{pmatrix} \cdot \begin{pmatrix} x - x0 \\ y - y0 \end{pmatrix}$$

Thus, the coordinates of the reference position o of the calibration chart (x0, y0) is obtained from the coordinates of the above Sc as follows.

$$\begin{pmatrix} x0 \\ y0 \end{pmatrix} = -\left( \begin{pmatrix} \cos\theta & -\sin\theta \\ \sin\theta & \cos\theta \end{pmatrix} \begin{pmatrix} x1 \\ y1 \end{pmatrix} - \begin{pmatrix} xa \\ yc1 \end{pmatrix} \right)$$

(E) As a result, the difference between the reference position obtained in the first calibration measuring step and the reference position obtained in the second calibration measuring step corresponds to the offset amount between the stylus 24 of the contact-type detector 20 and the image probe 30.

Thus, the offset amounts OFx and OFy in the X-axis and Y-axis directions are obtained by calculating the difference between the reference position obtained in the first calibration measuring step and the reference position obtained in the second calibration measuring step (offset amount calculating step) and then the offset amounts OFx and OFy are stored in the offset amount storing portion 55. Upon storing the offset amounts, the calibration of the offset amount is completed.

Incidentally, the offset amount OFz in the Z-axis direction can be obtained, for instance, in the following process.

Using the auto-focusing function of the image probe 30, the height position of any one of the linewidth patterns is measured. In other words, the image probe 30 is moved in the up-and-down direction to set the focal point of the image probe 30 on the surface of the linewidth pattern, thereby obtaining the height position of the linewidth pattern from the Z-axis coordinate. The same linewidth pattern is measured by the stylus 24 of the contact-type detector 20 to obtain the position in the Z-axis direction of the contact-type detector 20 at the maximum height position of the linewidth pattern (i.e., the height to which the contact-type detector 20 is moved by the Z-axis driving mechanism 44 and the displacement amount of the stylus 24). The difference between the result of the image probe measurement (Z-axis coordinate) and the result of the stylus measurement (Z-axis coordinate) can be used as the offset amount OFz in the Z-axis direction.

Description of Measurement Operation

In order to measure an object, the image probe 30 captures the image of the object in response to a command from the input device 51. After being stored in the data storing portion 56, the image date of the object is displayed on the display 52.

When a measurement starting position (a position at which the stylus 24 of the contact-type detector 20 is first brought into contact) is designated by using the input device 51 in accordance with the image on the display 52, the controller 50 calculates the movement course of the relative movement mechanism 40 in consideration of the offset amounts OFx, OFy and OFz stored in the offset amount storing portion 55 so that the stylus 24 of the contact-type detector 20 is brought into contact with the measurement starting position on the object. The calculated movement course is stored in the program storing portion 54.

Upon receiving a command for starting measurement, the controller 50 operates the relative movement mechanism 40 in accordance with the movement course calculated by the movement course calculating unit and then brings the stylus 24 of the contact-type detector 20 into contact with the object. While the stylus 24 is in contact with the object, the relative movement mechanism 40 is operated to move the contact-type detector 20 relative to the object to measure the surface texture of the object.

Effects of Exemplary Embodiment

According to this exemplary embodiment, the contact-type detector 20 is provided with the stylus 24 that is brought into contact with the surface of an object and the image probe 30 that captures the image of the surface of the object. With this arrangement, after the image probe 30 captures the image of the object, the stylus 24 of the contact-type detector 20 can be automatically brought into contact with the measurement area on the object in accordance with the captured image of the object. An operator does not have to set the tip end of the stylus at the measurement starting position on the object while visually checking and adjusting the relative position between the tip end of the stylus and the measurement area on the object as in a typical apparatus. Thus, the stylus 24 can be prevented from interfering with the object while the burden on the operator can be reduced.

The stylus 24 of the contact-type detector 20 and the image probe 30 are offset from each other in the Z-axis direction, the X-axis direction and the Y-axis direction respectively by the offset amounts OFz, OFx and OFy. Thus, during the measurement, the stylus 24 and the image probe 30 can be prevented from being interfered with each other without providing a mechanism for evacuating one of the stylus 24 and the image probe 30 that is not used for the measurement.

The offset amounts OFx, OFy and OFz between the tip end of the stylus 24 of the contact-type detector 20 and the image probe 30 are stored in the offset amount storing portion 55. These offset amounts stored in the offset amount storing portion 55 are taken into consideration in operating the movement course of the relative movement mechanism 40 so that the stylus 24 of the contact-type detector 20 is brought into contact with the measurement starting position on the object. Thus, the stylus 24 of the contact-type detector 20 can be accurately brought into contact with the measurement starting position on the object.

The calibration chart 80 provided with the not less than two non-parallel linewidth patterns 81A to 81D and 82A to 82D being disposed relative to the reference position o and each having the level difference as well as the known inclination and width is used to calibrate the offset amounts between the stylus 24 of the contact-type detector 20 and the image probe 30. The calibration chart 80 is set on the stage 10 and then the image of the linewidth patterns of the calibration chart 80 is captured by the image probe 30 to obtain the reference position o of the calibration chart 80. Furthermore, two of the linewidth patterns of the calibration chart 80 are measured by the contact-type detector 20 to obtain the reference position o of the calibration chart 80. The difference between the reference positions is then calculated to obtain the offset amounts. In this manner, the offset amounts between the contact-type detector 20 and the image probe 30 can be accurately and efficiently obtained.

The calibration chart 80 includes the rhombic linewidth pattern 81 formed by combining in a rhombic shape the linewidth patterns each having the level difference as well as the known inclination and width, and the cross-shaped linewidth pattern 82 formed by combining in a cross the linewidth patterns each having the level difference as well as the known inclination and width. Thus, even when the calibration chart 80 is not accurately oriented at the time of setting the calibration chart 80 on the stage 10, the calibration chart 80 can be set in an orientation allowing the contact-type detector 20 to measure at least two of the linewidth patterns of the calibration chart 80 in the second calibration measuring step. Thus, the calibration can be efficiently performed.

At least one of the stylus 24 of the contact-type detector 20 and the image probe 30 is exchangeable, so that the stylus 24 and/or the image probe 30 can be exchanged with one appropriate for the measurement portion of an object.

Further, since the calibration chart setting step, the first calibration measuring step, the second calibration measuring step and the offset amount calculating step are performed upon exchanging the stylus 24 and/or the image probe 30, high accuracy in measurement can be always secured irrespective of the exchange.

Only the image probe 30 can be used for the measurement. For instance, while the width of a line, the diameter of a hole, or the like can be measured by using an image captured by the image probe 30, a dimension in the optical-axial direction of the objective lens 35 (level difference height) or the like can be measured by using the auto-focusing function of the image probe 30.

The relative movement mechanism 40 includes the X-axis driving mechanism 41 that moves the stage 10 on which an object is mounted in the X-axis direction, and the Y-axis driving mechanism 48 and the Z-axis driving mechanism 44 that move the contact-type detector 20 and the image probe 30 in the Y-axis direction and the Z-axis direction. Thus, the relative movement mechanism 40 enables the object and the contact-type detector 20 and the image probe 30 to move in the three dimensional directions, i.e., the X-axis direction, the Y-axis direction and the Z-axis direction that are set perpendicular to one another. Thus, the profile and surface roughness of the object can be measured irrespective of the orientation and attitude of the measurement portion of the object.

Both the contact-type detector 20 and the image probe 30 are attached to the Y-slider 47 while being offset from each other. Thus, there can be provided a simple and low-cost structure as compared with an apparatus in which a mechanism is provided for separately moving the contact-type detector 20 and the image probe 30.

The image probe 30 includes the objective lens 35, the LED 36 as a light source being located on the outer periphery of the objective lens 35, and the CCD sensor 37 that receives reflected light from an object that has passed through the objective lens 35. Thus, the CCD sensor 37 can highly accurately obtain the image of the surface of the object through the objective lens 35. In addition, since the LED 36 is located around the objective lens 35, the image probe 30 can be downsized as compared with a case where a lighting device is separately provided.

Modification

The invention is not limited to the above-described exemplary embodiment but may include modification(s) and improvement(s) made within a scope where an object of the invention can be attained.

The arrangement of the calibration chart is not limited to that of the exemplary embodiment.

For instance, only one of the rhombic linewidth pattern 81 and the cross-shaped linewidth pattern 82 may be used. Furthermore, the invention is not limited to using the rhombic linewidth pattern 81 and the cross-shaped linewidth pattern 82 but may use shape including not less than two non-parallel linewidth patterns being disposed relative to the reference position o and each having a level difference as well as known inclination and width.

Though the contact-type detector 20 includes the arm 25 being provided with the stylus 24 at the tip end thereof and the detecting portion 26 that detects the swing amount of the arm 25, the contact-type detector 20 may have any other arrangement as long as the surface profile and roughness of an object can be measured while the stylus 24 is in contact with the object.

Though the image probe 30 includes the probe head 33 being provided with the objective lens 35, the LED 36 as a light source being located on the outer periphery of the objective lens 35 and the CCD sensor 37 that receives reflected light from the object that has passed through the objective lens 35 to capture the image of the object, the invention is not limited thereto.

For instance, the LED 36 as a light source may be provided separately from the image probe. Furthermore, the objective lens 35 may be exchangeable so that the objective lens 35 is exchanged with one having a different magnification, so that an appropriate operation can be performed depending on the size of the measurement area on an object.

While the relative movement mechanism 40 enables the stage 10 to move in the X-axis direction and the contact-type detector 20 and the image probe 30 to move in the Y-axis direction and the Z-axis direction, the invention is not limited thereto. In other words, as long as the stage 10 and the contact-type detector 20 and the image probe 30 are movable in the three dimensional directions, either the stage 10 or the contact-type detector 20 and the image probe 30 may be movable.

Alternatively, the contact-type detector 20 and the image probe 30 may be associated with their respective relative movement mechanisms so that the contact-type detector 20 and the image probe 30 are independently moved.

What is claimed is:

1. An offset amount calibrating method for a surface texture measuring machine including: a stage on which an object is mounted; a contact-type detector being provided with a stylus that is brought into contact with a surface of the object; an image probe that captures an image of the surface of the object; a relative movement mechanism that relatively moves the stage against the contact-type detector and the image probe and moves the contact-type detector and the image probe against the stage; and a controller that controls an operation of the relative movement mechanism and executes processing on measurement data obtained by the contact-type detector and image data obtained by the image probe, the method obtaining an offset amount between the contact-type detector and the image probe, the method comprising:
    setting on the stage a calibration chart that includes not less than two non-parallel linewidth patterns being disposed relative to a reference position of the calibration chart and each having a known width and a level difference;
    capturing an image of the linewidth patterns of the calibration chart by the image probe to obtain the reference position of the calibration chart;
    measuring at least two of the linewidth patterns of the calibration chart by the contact-type detector to obtain the reference position of the calibration chart; and
    calculating a difference between the reference position obtained by using the image probe and the reference position obtained by using the contact-type detector to obtain the offset amount.

2. The method according to claim 1, wherein
    the calibration chart includes at least one of a rhombic linewidth pattern formed by combining in a rhombic shape the linewidth patterns and a cross-shaped linewidth pattern formed by combining in a cross the linewidth patterns.

3. A surface texture measuring machine comprising:
    a stage on which an object is mounted;
    a contact-type detector being provided with a stylus that is brought into contact with a surface of the object;
    an image probe that captures an image of the surface of the object;
    a relative movement mechanism that relatively moves the stage against the contact-type detector and the image probe and moves the contact-type detector and the image probe against the stage;
    a controller that controls an operation of the relative movement mechanism and executes processing on measurement data obtained by the contact-type detector and image data obtained by the image probe; and
    an offset amount storage unit that stores an offset amount obtained by the offset amount calibrating method according to claim 2, wherein
    when a measuring starting position on the object is designated based on the image of the object captured by the image probe, the controller operates the relative movement mechanism so that the stylus of the contact-type detector is brought into contact with the measurement starting position on the object in accordance with the offset amount stored in the offset amount storage unit as a compensation value.

4. The method according to claim 1, wherein
    at least one of the stylus of the contact-type detector and the image probe is exchangeable, and
    upon exchanging, the setting of the calibration chart, the obtaining of the reference position by using the image probe, the obtaining of the reference position by using the contact-type detector and the calculating of the offset amount are performed.

5. A surface texture measuring machine comprising:
    a stage on which an object is mounted;
    a contact-type detector being provided with a stylus that is brought into contact with a surface of the object;
    an image probe that captures an image of the surface of the object;
    a relative movement mechanism that relatively moves the stage against the contact-type detector and the image probe and moves the contact-type detector and the image probe against the stage;
    a controller that controls an operation of the relative movement mechanism and executes processing on measurement data obtained by the contact-type detector and image data obtained by the image probe; and
    an offset amount storage unit that stores an offset amount obtained by the offset amount calibrating method according to claim 4, wherein
    when a measuring starting position on the object is designated based on the image of the object captured by the image probe, the controller operates the relative movement mechanism so that the stylus of the contact-type detector is brought into contact with the measurement starting position on the object in accordance with the offset amount stored in the offset amount storage unit as a compensation value.

6. A surface texture measuring machine comprising:
    a stage on which an object is mounted;
    a contact-type detector being provided with a stylus that is brought into contact with a surface of the object;
    an image probe that captures an image of the surface of the object;

a relative movement mechanism that relatively moves the stage against the contact-type detector and the image probe and moves the contact-type detector and the image probe against the stage;

a controller that controls an operation of the relative movement mechanism and executes processing on measurement data obtained by the contact-type detector and image data obtained by the image probe; and an offset amount storage unit that stores an offset amount obtained by the offset amount calibrating method according to claim 1, wherein when a measuring starting position on the object is designated based on the image of the object captured by the image probe, the controller operates the relative movement mechanism so that the stylus of the contact-type detector is brought into contact with the measurement starting position on the object in accordance with the offset amount stored in the offset amount storage unit as a compensation value.

* * * * *